United States Patent [19]

Yui et al.

[11] 4,080,359

[45] Mar. 21, 1978

[54] TALC CONTAINING POLYOLEFIN COMPOSITIONS

[75] Inventors: Hiroshi Yui; Atsushi Maeda; Tomohiko Takahama, all of Yokkaichi, Japan

[73] Assignee: Mitsubishi Petrochemical Co., Ltd., Tokyo, Japan

[21] Appl. No.: 817,297

[22] Filed: Jul. 20, 1977

Related U.S. Application Data

[63] Continuation-in-part of Ser. No. 706,408, Jul. 19, 1976, abandoned.

[30] Foreign Application Priority Data

| Jul. 18, 1975 | Japan | 50-88036 |
| Jul. 15, 1976 | United Kingdom | 29428/76 |
| Jul. 16, 1976 | Germany | 2632213 |
| Jul. 16, 1976 | Netherlands | 7607908 |

[51] Int. Cl.² ............................................. C08K 3/34
[52] U.S. Cl. ............................. 260/42.45; 260/42.46; 260/45.85 B
[58] Field of Search .................. 260/42.45, 45.85 B

[56] References Cited

U.S. PATENT DOCUMENTS

| 3,285,855 | 11/1966 | Dexter et al. | 260/45.85 S |
| 3,364,250 | 1/1968 | Dexter et al. | 260/45.85 B |
| 3,553,158 | 1/1971 | Gilfillan | 260/42.45 |

FOREIGN PATENT DOCUMENTS

1,362,912   8/1974   United Kingdom.

*Primary Examiner*—James H. Derrington
*Attorney, Agent, or Firm*—Sughrue, Rothwell, Mion, Zinn and Macpeak

[57] ABSTRACT

A polyolefin composition comprising: (1) about 70 to about 35% by weight of a polyolefin; (2) about 30 to about 65% by weight of a talc containing a metal content of up to about 0.9% by weight; and (3) based on the total amount of (1) and (2), at least 0.02% by weight of a specific alkyl 3,5-di-t-butyl-4-hydroxy-hydrocinnamate and at least 0.03% by weight of a specific dialkyl thiodipropionate or acetate. A sheet formed from this composition is odor free, has good whiteness, and can be fabricated into food packaging containers by a vacuum or pressure forming technique.

7 Claims, No Drawings

TALC CONTAINING POLYOLEFIN COMPOSITIONS

CROSS-REFERENCE TO RELATED APPLICATIONS

This application is a continuation-in-part application of U.S. patent application Ser. No. 706,408 filed July 19, 1976, entitled "Talc Containing Polyolefin Compositions" now abandoned.

BACKGROUND OF THE INVENTION

1. Field of the Invention

This invention relates to a polyolefin composition containing talc.

2. Description of the Prior Art

Heretofore, large quantities of food packaging containers have been produced by vacuum or pressure forming of highly rigid plastic sheets such as polyvinyl chloride or high impact polystyrene. The use of materials of this kind, however, presents some difficulties. Polyvinyl chloride is suspected to be carcinogenic because of the monomer remaining therein, or damages incinerating furnaces as a result of evolving hydrogen chloride when burned therein. High impact polystyrene is likely to be partly dissolved out when in contact with fatty foods such as butter or margarine. Accordingly, in order to avoid pollution, the development of pollution free containers has been desired for food packaging and other purposes.

As is well known, polyolefins are highly safe materials for packaging foodstuffs, but suffer from the defects that they have low rigidity, produce extreme heat at the time of burning and their vacuum or pressure formability is poor.

We have made investigations in order to increase the rigidity of polyolefins, reduce the amount of heat they generate at the time of incineration and to improve their vacuum or pressure formability by incorporating inorganic fillers therein. In order, however, to incoporate inorganic fillers in polyolefins it is necessary either to use special polyolefins or to modify the surface of the inorganic fillers to increase their affinity with the polyolefins.

Inorganic filler containing polyolefin compositions which emerged from these investigations, however, were not satisfactory with respect to whiteness, vacuum or pressure formability and odor. In particular, in spite of the fact that talc is most suitable from the standpoint of acid resistance, cost, and ability to render the composition rigid, the incorporation of talc in polyolefins results in compositions having a poor color and a strong odor, which are not suitable for food packaging containers requiring cleanliness.

As to the use of talc incorporated into polyolefins, U.S. Pat. No. 3,553,158 discloses a composition comprising a thermoplastic hydrocarbon polymer, talc, a talc-deactivator and antioxidant stabilizers. Talc of a high metal content not only deteriorates the whiteness of a composition comprising a polyolefin such as polypropylene and a stabilizer but also markedly deteriorates the heat stability of the product. Therefore, in order to prevent such deterioration, a specific additive (e.g., a talc-deactivator) other than the stabilizer must be added to the composition, but where such a specific additive is added, it adversely influences vacuum or pressure formability, odor and the like of the composition. Specifically, where a composition of this kind is used to produce food packaging containers, the sheet formed from the composition must be odor free, must have good whiteness and must be easily fabricated into food packaging containers by vacuum or pressure forming techniques. In order to achieve the above objects, it is necessary to reduce the number and the amount of additives present to as low as possible.

The present invention overcomes the above-mentioned conventional defects by using talc having a metal content not higher than a specific level.

SUMMARY OF THE INVENTION

It is an object of this invention to provide a talc containing polyolefin composition having good whiteness, good vacuum or pressure formability and which is free from odor.

It is another object of this invention to provide a talc containing polyolefin composition suitable for food packaging containers, especially containers for packaging fatty foods, which has good whiteness and is free from odor.

These objects can be achieved by a talc containing polyolefin composition comprising:

(1) about 70 to about 35% by weight of one or more polyolefins;

(2) about 30 to about 65% by weight of a talc containing a metal content of up to about 0.9% by weight, and (3) (A) at least 0.02% by weight, based on the total amount of the polyolefin(s) (1) and the talc (2), of a compound or compounds within the following general formula (alkyl 3,5-di-t-butyl-4-hydroxy-hydrocinnamate):

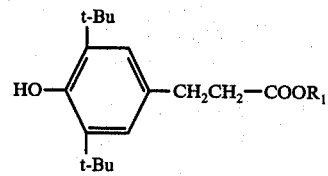

wherein $R_1$ is a straight chain or branched chain alkyl group; and (B) at least 0.03% by weight, based on the total amount of the polyolefin(s) (1) and the talc (2), of one or more compounds within the following general formula (dialkyl thiodipropionates or acetates):

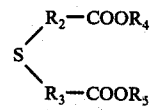

wherein $R_2$ and $R_3$ represent an alkyl group containing 2 or 3 carbon atoms, and $R_4$ and $R_5$ represent a straight chain or branched chain alkyl group.

DETAILED DESCRIPTION OF THE INVENTION

Typical examples of component A include stearyl 3,5-di-t-butyl-4-hydroxy-hydrocinnamate, lauryl 3,5-di-t-butyl-4-hydroxy-hydrocinnamate, and tetrakis[methylene(3,5-di-t-butyl-4-hydroxy-hydrocinnamic ester)]methane.

Typical examples of component B are dilauryl thiodipropionate, distearyl thiodipionte, laurylstearyl thiodipropionate and $\beta,\beta'$-dilauryl thiodipropionate.

In addition to these components A and B, other modifiers may be incorporated into the polyolefin composition.

The amount of component A is at least 0.02% by weight, preferably 0.03 to 0.3% by weight, and the amount of component B is at least 0.03% by weight, preferably 0.05 to 0.5% by weight, both based on the total amount of the polyolefin(s) and the talc.

When the amounts of these components are small, the effect of improving the color, especially whiteness, and the odor of the resulting composition cannot be achieved. The amounts may be increased, but for economic reasons, the amount of each of the components A and B is preferably not more than about 2% by weight.

The polyolefins used in the present invention include, for example, poly($\alpha$-olefins) such as polypropylene, high density polyethylene or low density polyethylene, and copolymers of $\alpha$-olefins. A propylene/ethylene copolymer, particularly a propylene/ethylene block copolymer, is especially suitable because of its high affinity with talc. The propylene/ethylene block copolymers disclosed in British Pat. No. 1,362,912 are especially preferred because of their exceedingly high affinity for talc.

The talc which can be used in the present invention is one having a metal content of up to about 0.9% by weight, based on the weight of the talc. The term metal content as used herein means the sum of the Fe and Al (percent by weight) contained in the talc. If the metal content is higher than about 0.9% by weight, such a talc adversely affects the properties (e.g., odor, whiteness, vacuum or pressure formability, etc.) of a composition comprising polyolefins and stabilizers. To obtain compositions having particularly superior properties, talc having a metal content of up to about 0.5% by weight is preferably used. Talc produced in the People's Republic of China and talc produced in North Korea are suitable used since such contain generally a metal content less than 0.5% by weight.

The talc acts mutually on the components A and B in a complex way, and a clean composition having good color which is free from odor can be obtained as compared with a composition merely comprising a polyolefin and the talc or a composition which includes another third component. The average particle diameter of the talc is preferably about 0.1 to about 20 microns, more preferably 0.5 to 5 microns.

The talc is most preferred from the standpoint of acid resistance, cost, and ability to render the product rigid, but other inorganic fillers generally used (for example, those as disclosed in British Pat. No. 1,362,912) can, if desired, be used together with the talc. These fillers may be surface-modified prior to use, if desired.

The mixing ratio of the polyolefin(s) to the talc is about 70 to about 35 parts by weight/about 30 to about 65 parts by weight, preferably 65 to 50 parts by weight/ 35 to 50 parts by weight. If the amount of the talc is less than about 30 parts by weight, the rigidity of the polyolefin composition is reduced and its vacuum or pressure formability becomes poor. If it exceeds about 65 parts by weight, the sheet formability of the composition is reduced.

As required, the polyolefin composition in accordance with this invention may further include a coloring pigment such as titanium oxide, a rubber ultraviolet absorbent such as propylene/ethylene rubber or styrene/butadiene rubber, or a neutralizing agent such as calcium stearate.

A polyolefin modified with maleic anhydride, or a polyoefin modified with a silane compound may further be incorporated into the polyolefin composition in order to improve the vacuum formability or pressure formability of the resulting composition.

These raw materials may be kneaded using conventional methods, for example, using a roll, a Banbury mixer, a monoaxial extruder, or a biaxial extruder to form the polyolefin composition of this invention.

The composition of this invention is first molded into a sheet, and then fabricated into packaging containers for foods and the like. The sheet formation is easily carried out using a vent-equipped extrusion molding machine or a calender roll.

The resulting sheet can be fabricated into varous shapes by a vacuum forming method or a pressure forming method. If desired, polyolefin film, for example, may be laminated onto the surface of the sheet so as to produce fabricated articles having good gloss.

The fabricated articles prepared from the sheet using the composition of this invention are pollution free and non-odoriferous and have good whiteness. Since their ingredients do not dissolve out during contact with fats in foodstuffs, the fabricated articles are especially suitable for use as food packaging containers.

The following Examples illustrate the present invention in greater detail. In the Examples, the metal content in the talc used was measured by fluorescent X-ray spectroscopy, the whiteness of the talc was measured using a Kett whiteness measurement apparatus and the whiteness of the sheet was measured using a color machine (CM-20) made by Color Machine Co.

Examples 1 to 16

The ingredients shown in Table 1 were incorporated in the amounts indicated in a mixture of 240 Kg of a propylene/ethylene block copolymer having an ethylene content of 10% by weight and a melt index of 1.0 g/10 minutes and 160 Kg of talc having a mtal content of 0.08% by weight and a whiteness of 96.3 (occurring in the People'Republic of China) with an average particle diameter of 2 microns. Each of the mixtures obtained was kneaded, and pelletized using a monoaxial extruder with a caliber of 90 mm. The resulting pellets were molded by a vent-type extruder with a caliber of 90 mm to form a sheet having a thickness of 0.3 mm.

The sheet was vacuum formed to produce containers for margarine. The whiteness and vacuum formability of the resulting sheets and the odor of the containers were determined, and the results are shown in Table 2.

As is seen from the results shown in Table 2, compositions containing components A and B in the amounts specified had very good color, freedom from odor, and vacuum formability, and the resulting containers could be fully used for packaging margarine.

Table 1

| Ex. | Component A (amount in parts by weight) | Component B (amount in parts by weight) | Other Components (amount in parts by weight) |
|---|---|---|---|
| 1* | — | — | — |
| 2* | Stearyl 3,5-di-t-butyl-4-hydroxy-hydrocinnamate (0.10) | — | — |
| 3* | " (0.10) | Distearyl -thiodi-propionate (0.02) | — |
| 4 | " (0.10) | " (0.10) | — |
| 5 | " (0.10) | " (0.30) | — |
| 6 | " (0.10) | " (0.50) | — |
| 7* | — | " (0.10) | — |

Table 1-continued

| Ex. | Component A (amount in parts by weight) | Component B (amount in parts by weight) | Other Components (amount in parts by weight) |
|---|---|---|---|
| 8* | Stearyl 3,5-di-t-butyl-4-hydroxy-hydrocinnamate (0.01) | " (0.10) | — |
| 9 | " (0.05) | " (0.10) | — |
| 10 | " (0.30) | " (0.10) | — |
| 11* | — | " (0.10) | 2,6-Di-t-butylphenol (0.10) |
| 12* | — | " (0.10) | 1,1,3-Tri(2-methyl-4-t-butylphenyl)-butane (0.10) |
| 13 | tetrakis [Methylene (3,5-di-t-butyl-4-hydroxy-hydrocinnamic ester)]methane (0.10) | Dilauryl thiodipropionate (0.10) | — |
| 14 | " (0.10) | Distearyl thiodipropionate (0.10) | — |
| 15 | Stearyl 3,5-di-t-butyl-4-hydroxy-hydrocinnamate (0.10) | Dilauryl thiodipropionate (0.10) | — |
| 16 | " (0.10) | Laurylstearyl thiodipropionate (0.10) | — |

*Comparison Examples

Table 2

| Ex. | Whiteness of Sheet | Vacuum Formability | Odor of Container |
|---|---|---|---|
| 1* | 78.5 | Poor | Strong odor present |
| 2* | 79.2 | Poor | Present |
| 3* | 81.0 | Somewhat poor | Slightly present |
| 4 | 85.0 | Good | Weak |
| 5 | 85.7 | Good | Weak |
| 6 | 86.4 | Good | Weak |
| 7* | 79.3 | Poor | Present |
| 8* | 82.0 | Somewhat poor | Slightly present |
| 9 | 84.5 | Good | Weak |
| 10 | 86.2 | Good | Weak |
| 11* | 79.7 | Somewhat poor | Slightly present |
| 12* | 79.5 | Somewhat poor | Slightly present |
| 13 | 84.5 | Good | Weak |
| 14 | 84.2 | Good | Weak |
| 15 | 85.2 | Good | Weak |
| 16 | 84.9 | Good | Weak |

*Comparison Examples.

Examples 17 to 26

The ingredients shown in Table 3 were added in the proportions indicated to a mixture of 200 Kg of high density polyethylene having a density of 0.9 g/cc and a melt index of 0.4 g/10 minutes and 200 Kg of talc having a metal content of 0.30% by weight and a whiteness of 95.7 with an average diameter of 1 micron (occurring in North Korea), and each of the mixtures was kneaded and pelletized using a monoaxial extruder having a caliber of 65 mm. The resulting pellets were fabricated by a calender roll to form a sheet having a thickness of 0.5 mm.

The sheet was vacuum or pressure formed to produce ice cream containers.

The whiteness and vacuum or pressure formability of the resulting sheets, and the odor of the containers, were determined, and the results are shown in Table 4.

As is shown in Table 4, the sheets formed had very good color, freedom from odor and vacuum or pressure formability, and the containers fabricated were useful as ice cream containers.

Table 3

| Ex. | Component A (amount in parts by weight) | Component B (amount in parts by weight) | Other Components (amount in parts by weight) |
|---|---|---|---|
| 17* | — | — | — |
| 18* | Stearyl 3,5-di-t-butyl-4-hydroxy-hydrocinnamate (0.10) | — | — |
| 19* | " (0.10) | Distearyl thiodipropionate (0.02) | — |
| 20 | " (0.10) | " (0.10) | — |
| 21* | — | " (0.10) | — |
| 22* | Stearyl 3,5-di-t-butyl-4-hydroxy-hydrocinnamate (0.01) | " (0.10) | — |
| 23 | " (0.03) | " (0.10) | — |
| 24 | " (0.30) | " (0.10) | — |
| 25* | — | " (0.10) | 2,6-Di-t-butyl phenol (0.10) |
| 26* | — | " (0.10) | 1,1,3-Tri(2-methyl-4-hydroxy-5-t-butylphenyl)-butane (0.10) |

*Comparison Examples

Table 4

| Ex. | Whiteness of Sheet | Vacuum or Pressure Formability | Odor of Container |
|---|---|---|---|
| 17* | 79.3 | Poor | Strong |
| 18* | 79.9 | Poor | Present |
| 19* | 81.7 | Somewhat Poor | Slightly present |
| 20 | 85.5 | Good | Weak |
| 21* | 79.8 | Poor | Present |
| 22* | 81.2 | Somewhat poor | Slightly present |
| 23 | 84.4 | Good | Weak |
| 24 | 86.6 | Good | Weak |
| 25* | 79.8 | Somewhat poor | Slightly present |
| 26* | 80.0 | Somewhat poor | Slightly present |

*Comparison Examples

Examples 27 to 56

The ingredients shown in Table 5 were incorporated in the amounts indicated into 240 Kg of a propylene-/ethylene block copolymer having an ethylene content of 10% by weight and a melt index of 1.0 g/10 minutes. Each of the mixtures obtained was formed into a sheet having a thickness of 0.3 mm in the same manner as in Examples 1-16.

The sheet was vacuum formed to produce containers for margarine. The whiteness and vacuum or pressure formability of the resulting sheets and the odor of the containers were determined, and the results obtained are shown in Table 6.

As is seen from the results shown in Table 6, compositions containing talc as specified and components A and B as specified had very good color, freedom from odor and vacuum formability, and the resulting containers could be fully used for packaging margarine, whereas compositions containing talc having a metal content larger than the specified amount and/or containing stabilizers other than the specified components A and B did not provide good results.

Further, it is apparent from the results shown in Table 6 that of the compositions showing good results, compositions containing talc having a metal content of not more than 0.5% by weight had superior vacuum formability and whiteness of the sheets.

Table 5

| Ex. | Talc (160 Kg) | Component A (0.24 Kg) | Component B (0.24 Kg) | Talc-Deactivator Kind | Amount (Kg) |
|---|---|---|---|---|---|
| 27* | A | G | J | — | 0 |
| 28* | A | G | J | L | 2.4 |
| 29* | A | H | J | — | 0 |
| 30* | A | H | J | L | 2.4 |
| 31* | B | G | J | — | 0 |
| 32* | B | G | J | L | 2.4 |
| 33* | C | G | J | — | 0 |
| 34* | C | G | J | L | 2.4 |
| 35 | C | H | J | — | 0 |
| 36* | C | H | J | L | 2.4 |
| 37 | C | I | J | — | 0 |
| 38* | C | I | K | M | 2.4 |
| 39* | D | G | K | — | 0 |
| 40* | D | G | J | L | 2.4 |
| 41 | D | H | J | — | 0 |
| 42* | D | H | J | L | 2.4 |
| 43 | D | I | J | — | 0 |
| 44* | D | I | K | M | 2.4 |
| 45* | E | G | K | — | 0 |
| 46* | E | G | J | L | 2.4 |
| 47 | E | H | J | — | 0 |
| 48* | E | H | J | L | 2.4 |
| 49 | E | I | J | — | 0 |
| 50* | E | I | K | M | 2.4 |
| 51* | F | G | K | — | 0 |
| 52* | F | G | J | L | 2.4 |
| 53 | F | H | J | — | 0 |
| 54* | F | H | J | L | 2.4 |
| 55 | F | I | J | — | 0 |
| 56* | F | I | K | M | 2.4 |

Notes
Talc:

| | Metal Content (% by weight) | Remarks |
|---|---|---|
| A | 1.57 | Trade name "Desertalc 57", whiteness: 90.1, occurring in the U.S.A. |
| B | 1.0 | Trade name "Mistron vapor", whiteness: 89.0, occurring in the U.S.A. |
| C | 0.08 | Average diameter; 2 μ, whiteness: 96.3, occurring in the People's Republic of China |
| D | 0.30 | Average diameter: 1 μ, whiteness: 95.7, occurring in North Korea |
| E | 0.50 | Average diameter: 1 μ, whiteness: 94.2, a blend of 27 parts by weight of B and 73 parts by weight of D |
| F | 0.87 | Average diameter: 1 μ, whiteness: 91.3, a blend of 81 parts by weight of B and 19 parts by weight of D |

Component A:
- G: 2,6-Di-t-butyl-4-methylphenol
- H: Stearyl 3,5-di-t-butyl-4-hydroxy-hydrocinnamate
- I: tetrakis [Methylene (3,5-di-t-butyl-4-hydroxyhydrocinnamic ester)]methane Component B:
- J: Dilauryl thiodipropionate
- K: Distearyl thiodipropionate Talc-Deactivator:
- L: Octyl epoxystearate
- M: Stearylamine

*Comparison Examples

Table 6

| Example | Whiteness of Sheet | Vacuum or Pressure Formability | Odor of Container |
|---|---|---|---|
| 27* | 70.3 | Poor | Present |
| 28* | 77.8 | " | " |
| 29* | 68.5 | " | " |
| 30* | 75.0 | " | " |
| 31* | 66.9 | " | " |
| 32* | 74.2 | " | " |
| 33* | 79.5 | " | " |
| 34* | 80.0 | " | " |
| 35 | 86.0 | Good | Weak |
| 36* | 86.2 | Somewhat poor | Slightly present |
| 37 | 85.8 | Good | Weak |
| 38* | 85.9 | Somewhat poor | Slightly present |
| 39* | 79.3 | Poor | Present |
| 40* | 80.5 | Poor | Present |
| 41 | 86.6 | Good | Weak |
| 42* | 86.8 | Somewhat poor | Slightly present |
| 43 | 85.8 | Good | Weak |
| 44* | 86.0 | Somewhat poor | Slightly present |
| 45* | 77.9 | Poor | Present |
| 46* | 80.3 | Poor | Present |
| 47 | 86.2 | Good | Weak |
| 48* | 86.4 | Somewhat poor | Slightly present |
| 49 | 86.1 | Good | Weak |
| 50* | 86.7 | Somewhat poor | Slightly present |
| 51* | 74.6 | Poor | Present |
| 52* | 78.9 | " | " |
| 53 | 85.0 | Good | Weak |
| 54* | 85.2 | Somewhat poor | Slightly present |
| 55 | 85.1 | Good | Weak |
| 56* | 85.3 | Somewhat poor | Slightly present |

While the invention has been described in detail and with reference to specific embodiments thereof, it will be apparent to one skilled in the art that various changes and modifications can be made therein without departing from the spirit and scope thereof.

What is claimed is:

1. A talc-containing polyolefin composition consisting essentially of
   (1) about 70 to about 35% by weight of polyolefin;
   (2) about 30 to about 65% by weight of a talc wherein the sum of Fe and Al content is up to about 0.9% by weight, and
   (3) (A) at least 0.02% by weight, based on the total amount of the polyolefin (1) and the talc (2), of a compound of the following general formula:

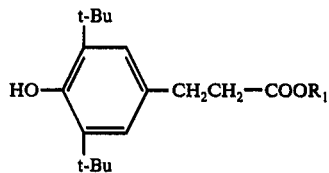

wherein $R_1$ is a straight chain or branched chain alkyl group; and
   (B) at least 0.03% by weight, based on the total amount of the polyolefin (1) and the talc (2), of a compound of the following general formula

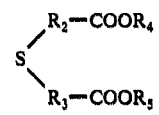

wherein $R_2$ and $R_3$ represent an alkyl group containing 2 or 3 carbon atoms, and $R_4$ and $R_5$ represent a straight chain or branched chain alkyl group.

2. The composition of claim 1, wherein the amount of the talc is 35 to 50% by weight.

3. The composition of claim 1, wherein the polyolefin is a propylene/ethylene block copolymer.

4. The composition of claim 1, wherein the sum of Fe and Al content in the talc is about 0.5% by weight or less.

5. The composition of claim 1, wherein said component (A) is stearyl 3,5-di-t-butyl-4-hydroxy-hydrocinnamate or tetrakis-methane.

6. The composition of claim 1, wherein said component (B) is distearyl thiodipropionate, dilauryl thiodipropionate or lauryl stearyl thiodipropionate.

7. A sheet composed of the composition of claim 1, for the production of food packaging containers.

* * * * *